US011209321B2

(12) United States Patent
Speck et al.

(10) Patent No.: US 11,209,321 B2
(45) Date of Patent: Dec. 28, 2021

(54) METHODOLOGY AND SYSTEM FOR DETERMINING TEMPERATURE OF SUBSEA INFRASTRUCTURE

(71) Applicant: OneSubsea IP UK Limited, London (GB)

(72) Inventors: Andrew Speck, Milton, MA (US); Albert Ballard Andrews, Wilton, CT (US); Irfan Bulu, Brighton, MA (US); Yi-Qiao Song, Newton, MA (US); Neil Herbst, Houston, TX (US)

(73) Assignee: OneSubsea IP UK Limited, London (GB)

( * ) Notice: Subject to any disclaimer, the term of this patent is extended or adjusted under 35 U.S.C. 154(b) by 394 days.

(21) Appl. No.: 16/262,248

(22) Filed: Jan. 30, 2019

(65) Prior Publication Data

US 2019/0234808 A1 Aug. 1, 2019

Related U.S. Application Data

(60) Provisional application No. 62/623,796, filed on Jan. 30, 2018.

(51) Int. Cl.
*G01K 11/12* (2021.01)
*E21B 41/00* (2006.01)
(Continued)

(52) U.S. Cl.
CPC .......... *G01K 11/12* (2013.01); *E21B 41/0007* (2013.01); *E21B 41/04* (2013.01);
(Continued)

(58) Field of Classification Search
CPC .......... G01K 11/12; G01K 3/14; G01K 7/427; G01K 11/00; G01K 2213/00;
(Continued)

(56) References Cited

U.S. PATENT DOCUMENTS 5,026,999 A 6/1991 Leonard
5,350,014 A * 9/1994 McKay .................. E21B 43/24
166/272.3
(Continued)

FOREIGN PATENT DOCUMENTS

KR 101426474 B1 8/2014
WO 2011161513 A1 12/2011

OTHER PUBLICATIONS

Extended European Search Report issued in European Patent Appl. No. 19154445.1 dated Jul. 11, 2019, 11 pages.
(Continued)

*Primary Examiner* — Nathaniel T Woodward
*Assistant Examiner* — Philip L Cotey
(74) *Attorney, Agent, or Firm* — Eileen Pape

(57) ABSTRACT

A technique utilizes spatially resolved temperature measurements to infer the temperature of a subsea infrastructure. According to an embodiment, temperature data, e.g. a temperature map, is determined for the subsea infrastructure and comprises performing remote temperature measurements of water surrounding the subsea infrastructure. Additionally, a metrological scan of the subsea structure may be obtained. Furthermore, a simulation or simulations may be run for an assumed temperature profile along a surface of the subsea infrastructure. The data obtained from the remote temperature measurements, the metrological scan, and the simulation is processed to determine a temperature profile of the subsea infrastructure. This temperature profile can then be used to facilitate a variety of subsea infrastructure management decisions.

20 Claims, 5 Drawing Sheets

(51) Int. Cl.
*G01S 17/89* (2020.01)
*G01K 3/14* (2006.01)
*E21B 41/04* (2006.01)
*G01K 11/00* (2006.01)
*G01K 7/42* (2006.01)
*G01S 17/88* (2006.01)

(52) U.S. Cl.
CPC ............... *G01K 3/14* (2013.01); *G01K 7/427* (2013.01); *G01K 11/00* (2013.01); *G01S 17/88* (2013.01); *G01S 17/89* (2013.01); *G01K 2213/00* (2013.01)

(58) Field of Classification Search
CPC ...... E21B 41/0007; E21B 41/04; G01S 17/88; G01S 17/89
See application file for complete search history.

(56) References Cited

U.S. PATENT DOCUMENTS

| | | | | |
|---|---|---|---|---|
| 7,079,952 | B2* | 7/2006 | Thomas | E21B 43/14 702/13 |
| 10,698,112 | B2* | 6/2020 | Embry | G01S 17/89 |
| 2002/0099505 | A1* | 7/2002 | Thomas | E21B 43/14 702/12 |
| 2003/0128737 | A1* | 7/2003 | McGralh | G01K 11/3213 374/161 |
| 2003/0139916 | A1* | 7/2003 | Choe | E21B 41/0007 703/10 |
| 2009/0321636 | A1* | 12/2009 | Ragucci | G01S 19/14 250/330 |
| 2011/0127032 | A1* | 6/2011 | Rossi | E21B 43/01 166/250.01 |
| 2011/0194107 | A1* | 8/2011 | Hartog | G01K 11/32 356/301 |
| 2012/0022822 | A1 | 1/2012 | Rousselle | |
| 2012/0134533 | A1* | 5/2012 | Del Grande | G06K 9/0063 382/103 |
| 2013/0132050 | A1* | 5/2013 | Parry | E21B 47/07 703/2 |
| 2014/0256055 | A1* | 9/2014 | Pottorf | G01V 1/38 436/163 |
| 2014/0321839 | A1* | 10/2014 | Armstrong | H02J 13/00002 392/463 |
| 2016/0098502 | A1* | 4/2016 | Havre | E21B 43/00 703/9 |
| 2018/0217256 | A1* | 8/2018 | Stokes | G01K 13/00 |
| 2018/0321385 | A1* | 11/2018 | Embry | G01V 8/00 |
| 2019/0011552 | A1* | 1/2019 | Embry | G01C 21/1656 |
| 2019/0011565 | A1* | 1/2019 | Embry | G01S 15/74 |
| 2019/0219701 | A1* | 7/2019 | Embry | G01K 13/02 |
| 2019/0338621 | A1* | 11/2019 | Jin | G01K 7/427 |
| 2019/0339414 | A1* | 11/2019 | Davis | G01C 13/008 |
| 2020/0293704 | A1* | 9/2020 | Viecelli | G06F 30/23 |

OTHER PUBLICATIONS

D. A. Leonard, B. Caputo, R. L. Johnson, and F. E. Hoge, "Experimental remote sensing of subsurface temperature in natural ocean water," Geophys. Res. Lett., vol. 4, No. 7, pp. 279-281, Jul. 1977.

C. P. Artlett, "Remote sensing of water temperature using Raman Apectroscopy," McQuarie University: Department of Physics and Astronomy, Feb. 2015, 223 pages.

K. Schorstein, E. S. Fry, and T. Walther, "Depth-resolved temperature measurements of water using the Brillouin lidar technique," Appl. Phys. B, vol. 97, No. 4, p. 931-934, Dec. 2009.

M. M. McKeever et al., "The Thermographic Phosphor Labkit," 2015 BFY Proceedings, Nov. 2015, pp. 68-71.

S. Otto, N. Scholz, T. Behnke, U. Resch-Genger, and K. Heinze, "Thermo-Chromium: A Contactless Optical Molecular Thermometer," Chem. Eur. J., May 2017, vo. 23, pp. 12131-12135.

* cited by examiner

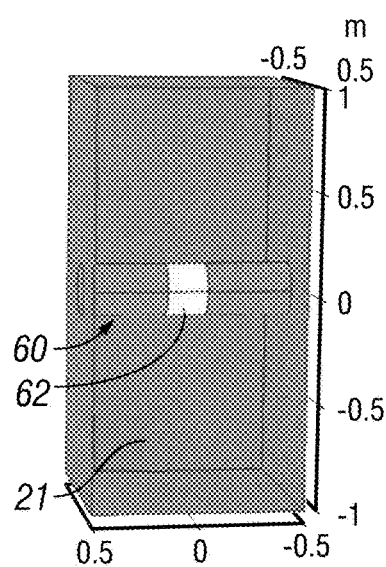 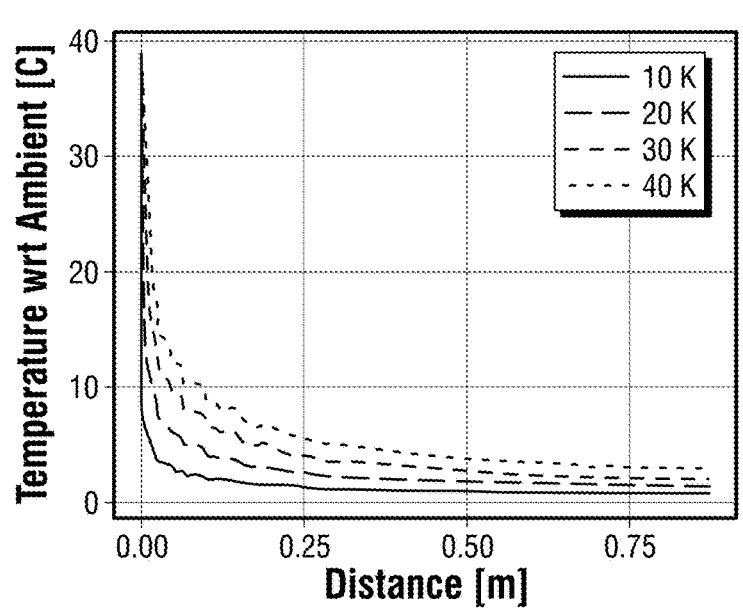
*FIG. 8A*  *FIG. 8B*

METHODOLOGY AND SYSTEM FOR DETERMINING TEMPERATURE OF SUBSEA INFRASTRUCTURE

CROSS-REFERENCE TO RELATED APPLICATION

The present document is based on and claims priority to U.S. Provisional Application Ser. No. 62/623,796, filed Jan. 30, 2018, which is incorporated herein by reference in its entirety.

BACKGROUND

Surface temperatures of subsea infrastructure can be useful for well operators. For example, detection of anomalies with respect to temperature enables prognostic health management of equipment, including looking for insulation damage and compression failure. Various systems have been developed to determine remote water temperature measurements for oceanographic purposes. For example, Raman spectroscopy has been used to obtain temperature data. Additionally, temperature sensors have been embedded in some types of infrastructure either as point sensors or as distributed fiber-optic based sensor systems.

SUMMARY

In general, a methodology and system are provided for utilizing spatially resolved temperature measurements to infer the temperature of a subsea infrastructure. According to an embodiment, temperature data, e.g. a temperature map, is determined for the subsea infrastructure and the technique comprises performing remote temperature measurements of water surrounding the subsea infrastructure. Additionally, a metrological scan of the subsea structure may be obtained. Furthermore, a simulation or simulations may be run for an assumed temperature profile on a surface of the subsea infrastructure. The data obtained from the remote temperature measurements, the metrological scan, and the simulation are processed to determine a temperature profile of the subsea infrastructure. This temperature profile can then be used to facilitate a variety of subsea infrastructure management decisions.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIGS. 8A and 8B are a graphical illustration of a modeled temperature differential compared to ambient water temperatures as a function of distance away from a subsea asset, e.g. from a pipe having an area of insulation removed, according to an embodiment of the disclosure.

DETAILED DESCRIPTION

Figure 1:
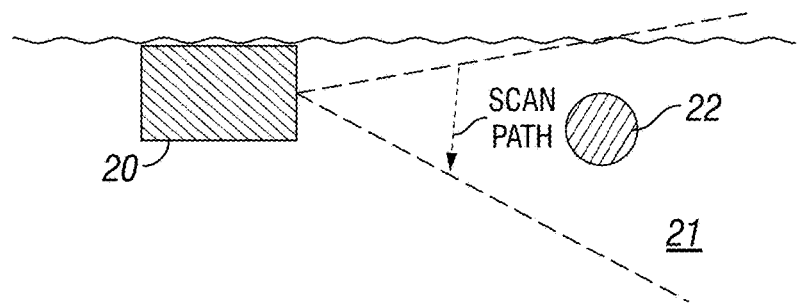
FIG. 1 is an illustration of an example of a fly-by remote temperature measurement technique for performing remote temperature measurements in water surrounding a subsea infrastructure, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a methodology and system to utilize spatially resolved temperature measurements to infer the temperature of subsea infrastructure including, for example, brownfields where no existing measurements exist. According to an embodiment, temperature data is determined for a subsea infrastructure and the technique comprises performing remote temperature measurements of water surrounding the subsea infrastructure. The remote temperature measurements may be performed by various systems and techniques and may be assembled in the form of a temperature map.

Additionally, a metrological scan of the subsea structure may be obtained. The metrological scan may be performed via a variety of techniques, including LIDAR (light detection and ranging) techniques. The metrological scan may then be interpreted to form a solid model of the subsea infrastructure. Furthermore, a simulation or simulations may be run for an assumed temperature profile on a surface of the subsea infrastructure. The data obtained from the remote temperature measurements, the metrological scan, and the simulation is processed to determine a temperature profile of the subsea infrastructure. This temperature profile can then be used to facilitate a variety of subsea infrastructure management decisions.

The methodology provides a technique to infer the temperature of the subsea infrastructure so as to produce, for example, answer products/solutions comparable to those provided by thermal cameras used terrestrially. Due to the high absorption of water at the wavelengths employed by thermal cameras (mid to long-wave infrared (IR)), use of thermal cameras is not possible for making remote measurements of temperature with respect to subsea infrastructure.

Instead, the methodology described herein inverts a forward model of the thermal heat transfer from the subsea infrastructure to the water surrounding it using a series of measurements at multiple spatial locations to produce a map of the temperature distribution along the subsea infrastructure. In some embodiments, a further refinement involves combining the temperature measurements with a metrological scan, e.g. a subsea LIDAR metrological scan, to produce an accurate three-dimensional model of the subsea infrastructure showing the temperature along the surface of the subsea infrastructure.

Production of a temperature map for the surface of the subsea infrastructure can be very useful for subsea well operators and subsea infrastructure managers. For example, anomalies in the temperature map of the subsea infrastructure surface can be used for prognostic health management of equipment, e.g. determining insulation damage and/or compression failure. The temperature map also may be used for flow assurance purposes by looking for temperature changes induced by, for example, blockages due to gas hydrate formation or other factors. By way of example, a time-lapse series of temperature measurements may be used to monitor for changes indicative of anomalies of interest.

In some embodiments, methods may be employed which do not use a direct simulation to link water temperature with subsea asset surface temperature. For example, proxy models may be generated which are simpler than the actual physics-based model. For example, multiple temperature simulations can be conducted to generate data to fit a simplified model which is then used in the inversion to determine the actual surface temperature of the subsea asset.

According to one example of the methodology, remote temperature measurements are initially performed, e.g. obtained, with respect to water surrounding a subsea infrastructure. For example, a fly-by remote temperature measurement of the water surrounding the subsea infrastructure of interest may be conducted via a variety of techniques. As illustrated in FIG. 1, an underwater vehicle 20, e.g. a remotely operated vehicle (ROV) or autonomous underwater vehicle (AUV), may be used to remotely measure water temperature in a region of water 21 surrounding a subsea infrastructure 22 as a function of position. The temperature data obtained may be inverted to produce an estimate of the subsea infrastructure temperature. The temperature measurements also may be acquired via a sensor or sensors mounted either permanently or temporarily on the seafloor or other subsea infrastructure. In such an embodiment, the temperature measurements can be acquired without the aid of the underwater vehicle.

Figure 2:
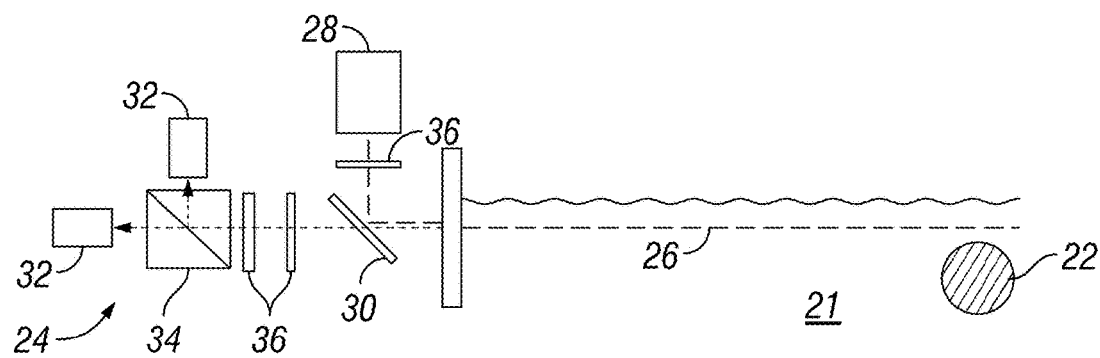
FIG. 2 is an illustration of another example of a system for obtaining remote temperature measurements using Raman spectroscopy to obtain temperature measurements in water surrounding a subsea infrastructure, according to an embodiment of the disclosure.

In some embodiments, the fly-by remote temperature measurement of the water surrounding the subsea infrastructure 22 may be performed via time-of-flight Raman spectroscopy. An example of a Raman spectroscopy optical set up 24 for obtaining fly-by temperature measurements with respect to subsea infrastructure 22 is illustrated in FIG. 2. With this type of technique, Raman scattered photons are detected along a laser beam path 26 which produces a return spectrum. Although the optical set up 24 may vary substantially depending on the specifics of a given application, the illustrated example employs a laser 28 used in combination with a dichroic mirror 30 to control the laser light. The system also uses a plurality of photomultiplier modules 32 used in combination with a beam splitter 34. A variety of filters 36 also may be used to provide desired filtering of the light signal.

Figure 3:
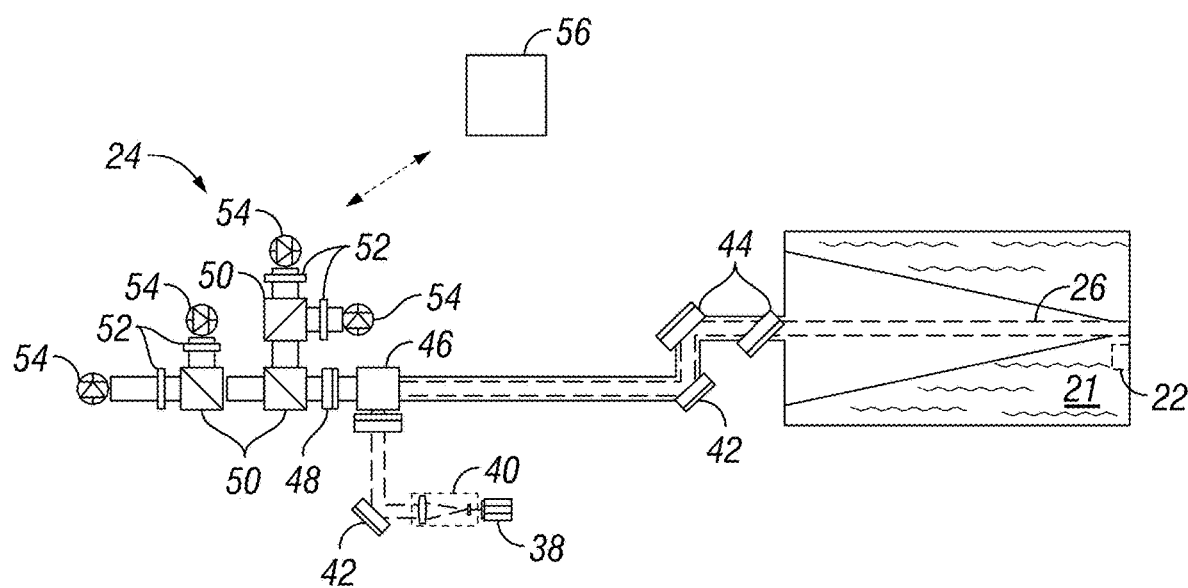
FIG. 3 is an illustration of another example of a system for obtaining remote temperature measurements in water surrounding a subsea infrastructure, according to an embodiment of the disclosure.

With additional reference to FIG. 3, another embodiment of optical set up 24 is illustrated for implementing a time-of-flight Raman scattering measurement technique. According to this technique, a pulsed laser is employed with a pulse length shorter than the desired spatial resolution (e.g. less than 5 cm). In various implementations, an excitation wavelength of around 425 nm would be desirable, however the values used herein are provided simply as examples and other wavelength values as well as other specifications may be used in a given optical set up 24. The technique also employs a detection system which may be used for the measurement of a plurality of, e.g. two, water Raman peaks with a sub-500 ps temporal resolution.

FIG. 3 illustrates a basic optical layout of an optical train. To split the Raman scattered light from the excitation beam, in this embodiment, a 532 nm laser 38 directs the laser light through a beam splitter/beam expander 40. The laser light is directed into water 21 via a plurality of mirrors 42. Additionally, co-linear back-scattered and excitation beams are then steered in azimuth and elevation by a pair of scanning mirrors 44, e.g. galvo scanning mirrors.

On the detection side, the excitation light is removed by a combination of a dichroic beam splitter 46 and a long pass filter 48 to ensure most of the 532 nm light is blocked. Then, a set of additional dichroic beam splitters 50 may be used to break the light into desired optical channels which are then further filtered using bandpass optical filters 52. The resulting light is then converted into electrical signals via photomultiplier modules 54. In addition to the two Raman optical channels (in some embodiments), a pair of background channels above and below the Raman peaks also may be utilized to enable correction for other scattering processes such as fluorescence.

Figure 4:
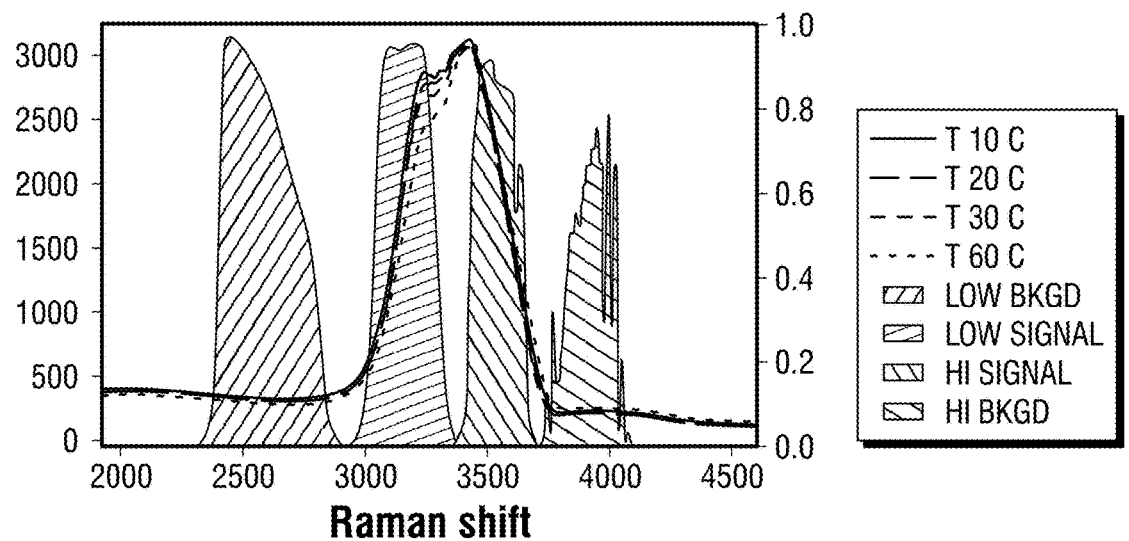
FIG. 4 is a graphical illustration showing responsivity of optical channels as a function of Raman spectral shift, according to an embodiment of the disclosure.
Figure 5:
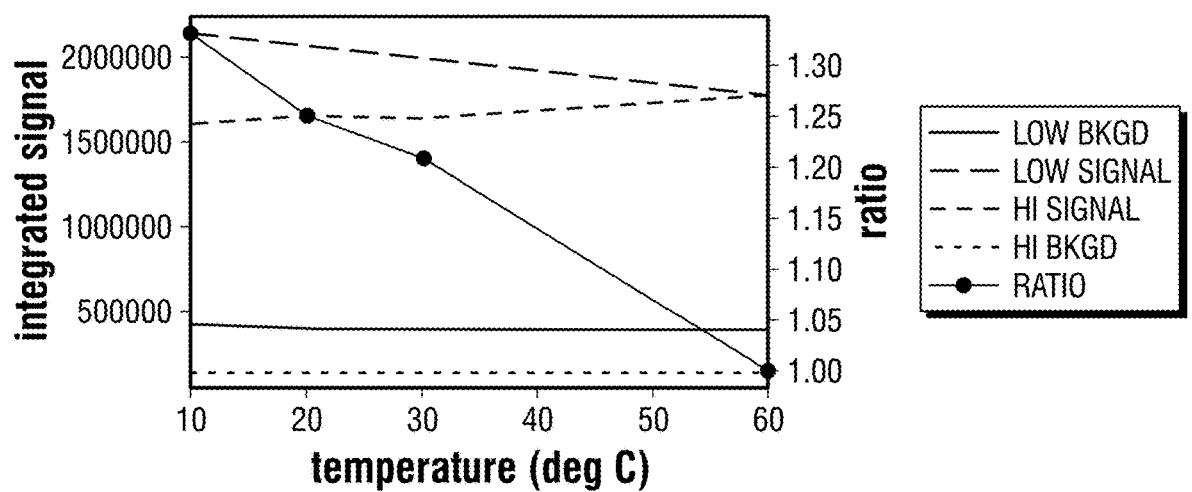
FIG. 5 is a graphical illustration showing the predicted signal in each optical channel as the temperature is varied along with the predicted ratio of the signal channels, according to an embodiment of the disclosure.

The resulting spectra for each optical channel are shown in FIG. 4 while the predicted signal as a function of water temperature is illustrated in FIG. 5. FIG. 4 provides a graphical illustration of the responsivity of each optical channel as a function of Raman spectral shift. The measured Raman scattering from water as a function of temperature is overlaid. FIG. 5 provides a graphical illustration which shows the predicted signal in each optical channel as the temperature is varied. FIG. 5 also illustrates the predicted ratio of the two signal channels.

The output from the photomultiplier modules 54 may be sent to a suitable processing system 56 to determine the desired temperature data, e.g. a temperature map related to the subsea asset. According to an example, processing system 56 may be a computer-based processing system configured to perform an analysis in which waveform data is converted from time, azimuth, and elevation to Cartesian points using saved timing, azimuth, and elevation voltages.

Additionally, the known photomultiplier module gains may be deconvolved. For example, high signal values may be removed due to the observed saturation of the photomultiplier module output above approximately 0.65 V. Additionally, each observed signal value may be corrected for the effect of optical absorption using known water absorption values. This is desirable because the optical absorption varies as a function of wavelength.

Figure 6:
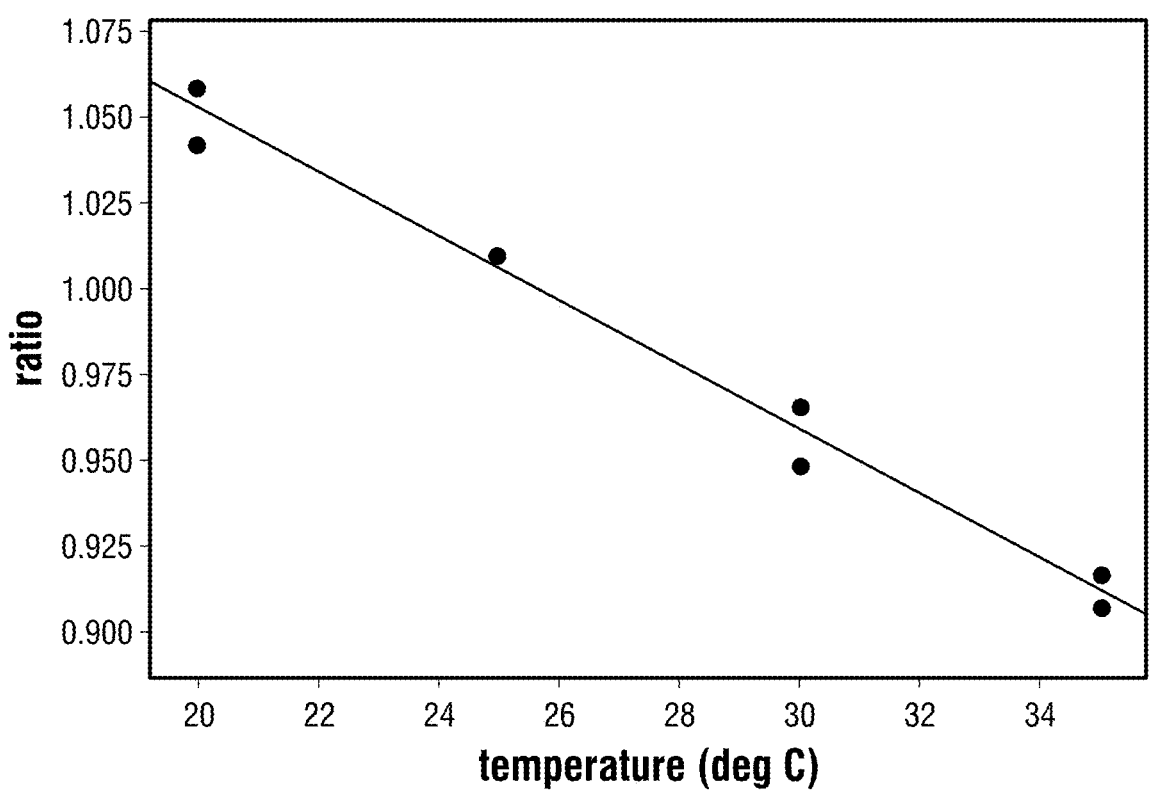
FIG. 6 is a graphical illustration showing a ratio of low to high Raman, channels versus water temperature, according to an embodiment of the disclosure.

Furthermore, the processing system 56 may be used for processing of the Cartesian points which may be binned at a desired spacing, e.g. a spacing of 0.25 cm laterally and a 2.5 cm axially (or other desired spacing). The points in each bin may be averaged using a geometric mean to preserve the ratio. Additionally, the ratio of the low signal channel to the high signal channel may be calculated for each bin. Based on this processing of the data obtained from the optical set up 24, a temperature map of the subsea asset (and/or other suitable temperature data) may be output for use in evaluating the operational status and/or health of the subsea asset 22. By way of example, the processing of the data may be used to establish a three-dimensional temperature distribution map near the subsea structure/asset 22. Experimental results showing the ratio of low to high Raman channels versus water temperature averaged over a volume of water are shown graphically in FIG. 6. The illustrated plot is linear and shows good sensitivity versus temperature.

It should be noted, however, the fly-by remote temperature measurement of the water surrounding the subsea infrastructure 22 may be performed via other techniques. Examples of such techniques include Brillouin spectroscopy, using thermally-sensitive paint employing phosphorous or other methods, by using a mesh of temperature sensors dragged along the area of interest, or by using a single point temperature sensor scanned across the volume of interest.

The methodology for determining temperature of the subsea infrastructure also may be enhanced by obtaining a suitable model, e.g. a suitable computer model, of the subsea infrastructure 22. The suitable model contains accurate physical measurements of the subsea structure/asset 22 and may be obtained via a metrological scan of the subsea infrastructure 22. Various types of metrological scans a be performed to obtain suitable measurements of the geometry of the subsea structure/asset 22. Additionally, performance of the metrological scan may be done simultaneously with the remote temperature measurements or in a separate stage.

Obtaining the metrological scan may be achieved via several subsea visualization techniques such as the use of LIDAR, a camera, structured light illumination, photogrammetry, and/or sonar. The metrological scan results, e.g. resulting data, can then be interpreted/processed to form a solid model of the subsea infrastructure 22. Optionally, the solid model can be replaced by previously obtained models based on CAD models, construction models, or other suitable models.

Figure 7:
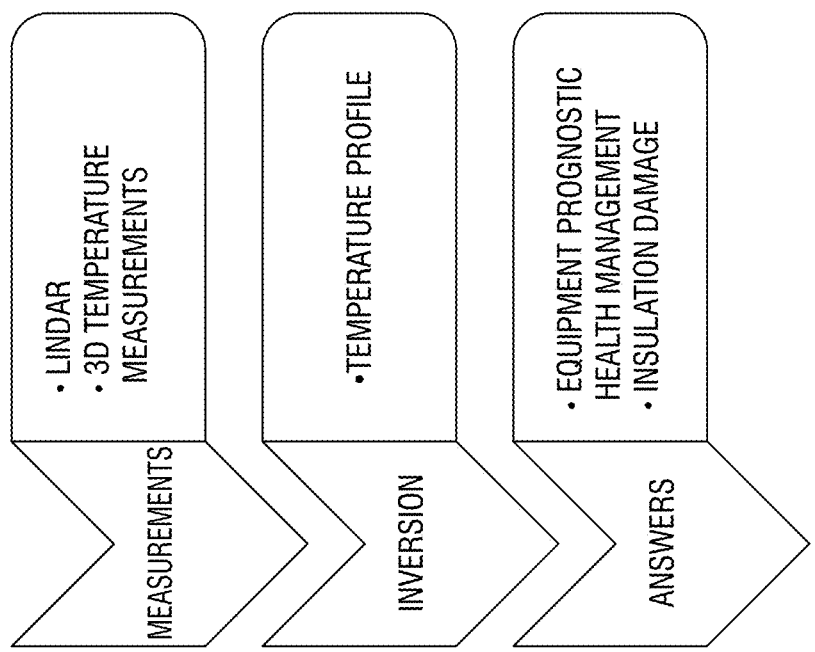
FIG. 7 is an illustration showing a processing of temperature measurement data combined with data obtained via a metrological scan, e.g. a LIDAR based metrological scan, to determine a temperature profile, according to an embodiment of the disclosure.
Figure 7:
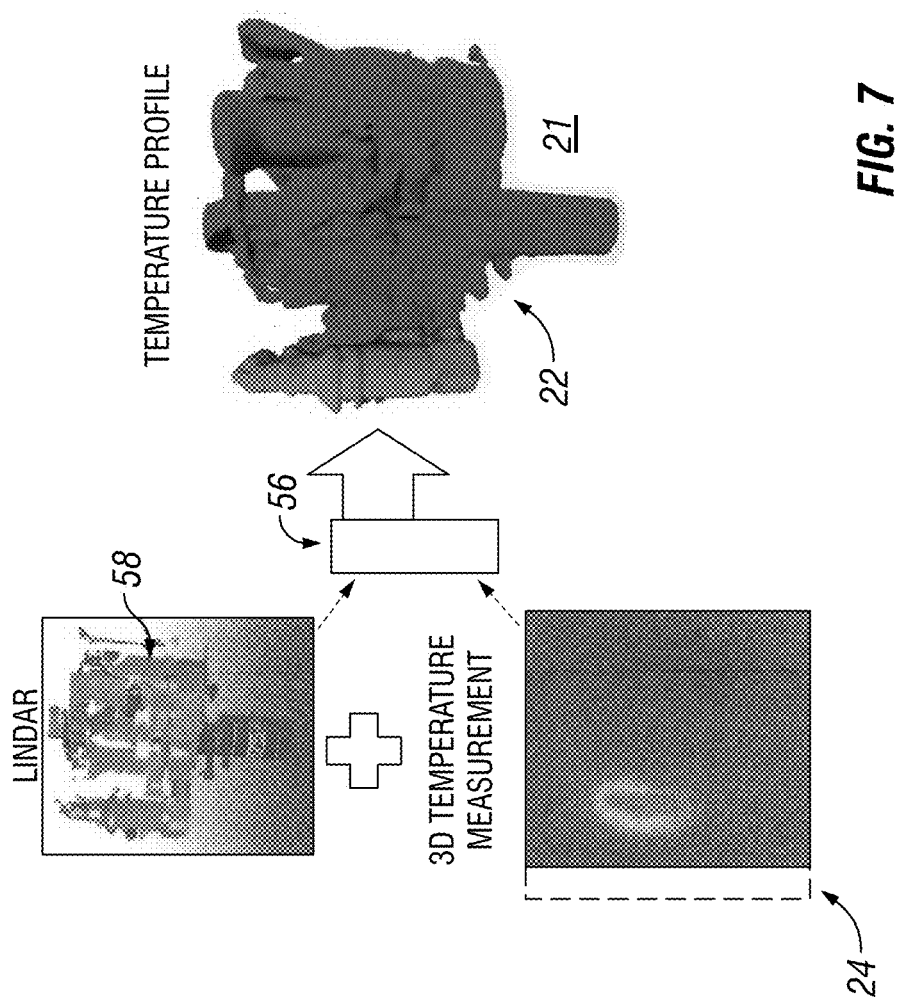

With reference to FIG. 7, an embodiment of the methodology for determining temperature of the subsea infrastructure 22 is illustrated. In this example, the data from the metrological scan (e.g. using a LIDAR system 58) and the data from the remote temperature measurements (e.g. using optical set up 24) are provided to the processor-based system 56, e.g. a computer based system. The processor-based system 56 is able to process the data obtained from both the three-dimensional temperature distribution near the subsea structure 22 combined with the accurate measurement of the subsea structure 22 from, for example, standard LIDAR scans via LIDAR system 58. By including the data from the LIDAR scans (or other suitable metrological scan), an accurate temperature profile, e.g. temperature map, may be determined with respect to the subsea structure/asset 22. For example, the geometric data obtained via the LIDAR scans may be used to provide an accurate temperature map with respect to the surface of the subsea structure/asset.

By way of example, an inversion may be performed on the data to obtain the desired temperature profile. The processor-based system 56 may be used to invert a forward model of the thermal heat transfer from the subsea infrastructure 22 to the water surrounding it based on the data obtained. The processed data may be used to produce a map of the temperature distribution along the subsea infrastructure. Use of the LIDAR metrological scan helps enable production of an accurate three-dimensional model of the subsea infrastructure showing temperatures along the infrastructure surface.

The methodology for determining temperature of the subsea infrastructure 22 also may comprise running a simulation or simulations for a given, e.g. assumed, temperature profile along the surface of the subsea infrastructure 22. The results of the simulation are then compared to measured data, as represented graphically in FIGS. 8A and 8B. Running of the simulations may comprise repeatedly running the simulation with adjustments to the assumed temperature profile until results of the simulation match measured temperature data.

In FIG. 8A, a graphical example is provided showing measurement of water temperature as a function of distance from a subsea structure, e.g. from an insulated subsea pipe 60 having a section 62 with missing insulation. In this example, the pipe 60 is heated a specified amount(s) above ambient and then temperature data is obtained at various distances from the section of pipe 60 as indicated graphically. Based on these results, a water temperature measurement with spatial resolution comparable to the pipe dimension and a temperature resolution of around 1° C. would be adequate to detect the missing insulation at section 62. This data may be used to improve the accuracy of the simulation(s) with respect to the assumed temperature profile along the surface of the subsea structure/asset 22. As illustrated in the graph of FIG. 8B, the fluid inside the pipe 60 as compared to ambient seawater was varied from 10° to 40° K and measured results were obtained and plotted.

The simulation may be repeated with adjustments to the assumed surface temperature profile until the simulation matches the measured temperature data, e.g. matches the temperature data obtained by heating the section of pipe 60 and measuring water temperatures at different distances from the section heated. The accuracy of the simulation (and thus the surface temperature results as well) can be enhanced by including convection losses due to nearby currents and by using temperature measurements built into the infrastructure itself to constrain the model.

It should be noted that various types of systems may be used to obtain the three-dimensional remote temperature data from around the subsea structure 22. Additionally, metrological scans may be performed by LIDAR systems or other types of systems able to obtain the desired geometrical measurements of the subsea structure 22. The processing system 56 also may be programmed with appropriate types of algorithms or other processing tools to facilitate the inversion of data so as to obtain the desired temperature data with respect to the subsea asset.

Regardless of the specifics of the given systems employed, the ability to obtain surface temperature measurements of the subsea infrastructure 22 substantially enhances the ability to analyze equipment health, e.g. to determine the location of potential insulation damage. The utilization of spatially resolved water temperature measurements combined with accurate geometry measurements to infer the temperature of the subsea asset surfaces provides a powerful tool for health diagnostics. The combination of Raman spectroscopy and LIDAR measurements provides the data which may be used to determine asset temperatures, although other techniques may be employed to obtain or to improve the collection of temperature and geometry data.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of determining temperature subsea, comprising:
performing remote temperature measurements of water surrounding a subsea infrastructure;
obtaining a model of the subsea infrastructure via a metrological scan;
running a simulation using an assumed temperature profile along a surface of the subsea infrastructure to generate output temperature measurements for the subsea infrastructure;
in response to determining that the output temperature measurements do not correlate with the remote temperature measurements, adjusting the assumed temperature profile; and
re-running the simulation using the assumed temperature profile as adjusted to generate the output temperature measurements for the subsea infrastructure.

2. The method as recited in claim 1, further comprising managing the subsea infrastructure based on the output temperature measurements.

3. The method as recited in claim 1, wherein performing remote temperature measurements comprises measuring temperatures via time-of-flight Raman spectroscopy.

4. The method as recited in claim 1, wherein performing remote temperature measurements comprises measuring temperatures via Brillouin spectroscopy.

5. The method as recited in claim 1, wherein performing remote temperature measurements comprises measuring temperatures via thermally sensitive paint.

6. The method as recited in claim 1, wherein performing remote temperature measurements comprises measuring temperatures via a mesh of temperature sensors dragged along an area of interest proximate the subsea infrastructure.

7. The method as recited in claim 1, wherein performing remote temperature measurements comprises measuring temperatures via a single point temperature sensor scanned across a volume of interest proximate the subsea infrastructure.

8. The method as recited in claim 1, wherein obtaining comprises obtaining the metrological scan using LIDAR (light detection and ranging).

9. The method as recited in claim 1, wherein obtaining comprises obtaining the metrological scan using a camera.

10. The method as recited in claim 1, wherein obtaining comprises obtaining the metrological scan using structured light illumination.

11. The method as recited in claim 1, wherein obtaining comprises obtaining the metrological scan using photogrammetry.

12. The method as recited in claim 1, wherein obtaining comprises obtaining the metrological scan using sonar.

13. The method as recited in claim 1, further comprising repeatedly re-running the simulation with adjustments to the assumed temperature profile to generate the output temperature measurements.

14. The method as recited in claim 1, wherein obtaining comprises obtaining the metrological scan simultaneously with performing remote temperature measurements.

15. The method as recited in claim 1, wherein performing remote temperature measurements comprises using an underwater vehicle to obtain the remote temperature measurements.

16. A method, comprising:
obtaining a three-dimensional temperature distribution near a subsea asset;
determining accurate measurements of the sub sea asset via a LIDAR (light detection and ranging) metrological scan;
generating a forward model of thermal heat transfer from the subsea asset to water surrounding the subsea asset based on the three-dimensional temperature distribution near the subsea asset and the LIDAR metrological scan; and
inverting the forward model to determine an actual surface temperature of the subsea asset.

17. The method as recited in claim 16, wherein obtaining the three-dimensional temperature distribution comprises measuring temperatures via Raman spectroscopy.

18. The method as recited in claim 16, wherein obtaining the three-dimensional temperature distribution comprises measuring temperatures via Brillouin spectroscopy.

19. A system, comprising:
a sensor system for obtaining a temperature distribution near a subsea asset;
a metrological scan system to obtain geometry measurements of the subsea asset; and
a processing system to generate a forward model of thermal heat transfer from the subsea asset to water surrounding the subsea asset based on the temperature distribution near the subsea asset obtained via the sensor system and the geometry measurements of the subsea asset obtained via the metrological scan system, and invert the forward model to determine surface temperatures of the subsea asset.

20. The system as recited in claim 19, wherein the metrological scan system comprises a LIDAR flight detection and ranging) system.

* * * * *